(12) United States Patent
Webber

(10) Patent No.: US 8,954,124 B2
(45) Date of Patent: Feb. 10, 2015

(54) ROLL-BACK COVER FOR AN ELECTRONIC DEVICE

(71) Applicant: Bruce Randall Webber, Wheaton, IL (US)

(72) Inventor: Bruce Randall Webber, Wheaton, IL (US)

( * ) Notice: Subject to any disclaimer, the term of this patent is extended or adjusted under 35 U.S.C. 154(b) by 14 days.

(21) Appl. No.: 13/887,198

(22) Filed: May 3, 2013

(65) Prior Publication Data

US 2014/0326638 A1    Nov. 6, 2014

Related U.S. Application Data

(60) Provisional application No. 61/643,245, filed on May 5, 2012.

(51) Int. Cl.
*H04M 1/00* (2006.01)
*B65D 63/10* (2006.01)
*B65D 43/12* (2006.01)

(52) U.S. Cl.
CPC ............ *B65D 63/1018* (2013.01); *B65D 43/12* (2013.01)
USPC .................. 455/575.8; 455/575.1; 455/575.5; 381/334; 206/320

(58) Field of Classification Search
USPC ............. 455/575.8, 575.1, 575.3, 575.4, 577, 455/575.5, 90.3; 206/38, 320, 701, 521; 361/679.01, 679.03, 679.06, 679.26, 361/679.27, 679.39, 679, 56, 679.56; 381/334; 428/99
See application file for complete search history.

(56) References Cited

U.S. PATENT DOCUMENTS

| | | | | |
|---|---|---|---|---|
| 5,218,474 | A * | 6/1993 | Kirschner | 359/601 |
| 5,733,674 | A * | 3/1998 | Law et al. | 429/9 |
| 7,072,699 | B2 * | 7/2006 | Eiden | 455/575.8 |
| 2004/0173482 | A1 * | 9/2004 | Nieves | 206/320 |
| 2004/0227860 | A1 * | 11/2004 | DePaolo et al. | 348/825 |
| 2005/0181745 | A1 * | 8/2005 | Wood et al. | 455/90.3 |
| 2009/0111543 | A1 * | 4/2009 | Tai et al. | 455/575.8 |
| 2009/0286431 | A1 * | 11/2009 | Li et al. | 439/893 |
| 2010/0062816 | A1 * | 3/2010 | Yu | 455/575.8 |
| 2011/0259788 | A1 * | 10/2011 | Zeliff et al. | 206/701 |
| 2011/0297566 | A1 * | 12/2011 | Gallagher et al. | 206/320 |
| 2012/0037524 | A1 * | 2/2012 | Lonsdale et al. | 206/320 |
| 2012/0322517 | A1 * | 12/2012 | Valdez | 455/575.8 |
| 2013/0070948 | A1 * | 3/2013 | Lee et al. | 381/334 |

* cited by examiner

*Primary Examiner* — Mahendra Patel
(74) *Attorney, Agent, or Firm* — Justin Lampel

(57) ABSTRACT

A protective roll-back cover for an electronic device is provided. The roll-back cover is suitable for use in association with an iPad®, Kindle®, Nook®, a cell phone, a reader, a tablet or other similar electronic devices. The device has a protective cover which rolls from a closed First Position A to an open Second Position B. In the closed First Position A, the screen of the electronic device is covered and protected. In the open Second Position B, the protective cover is rolled back into a storage area and a user may access the screen of the electronic device. The device further has a removable additional storage compartment(s), a rotatable stand, a sun screen and a movable storage area for storing a stylist.

14 Claims, 15 Drawing Sheets

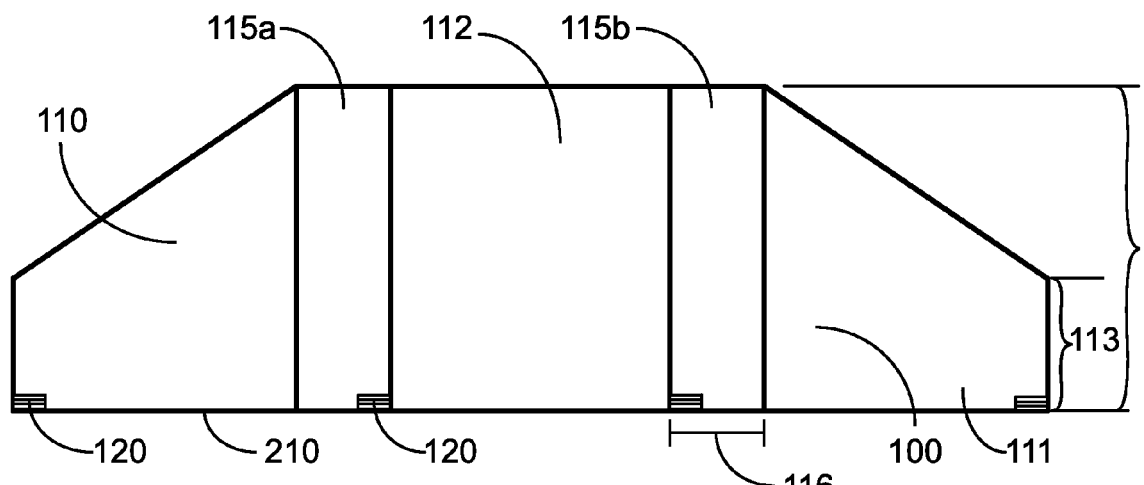
FIG.12
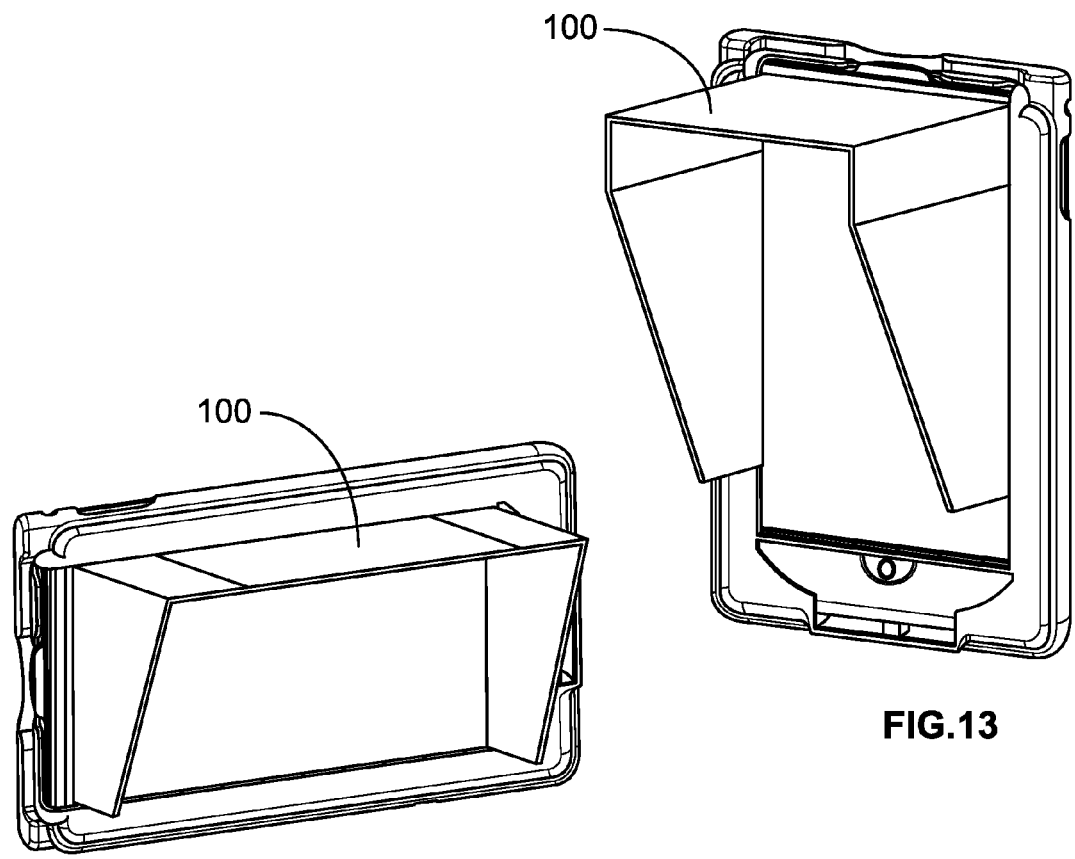
FIG.13
FIG.14

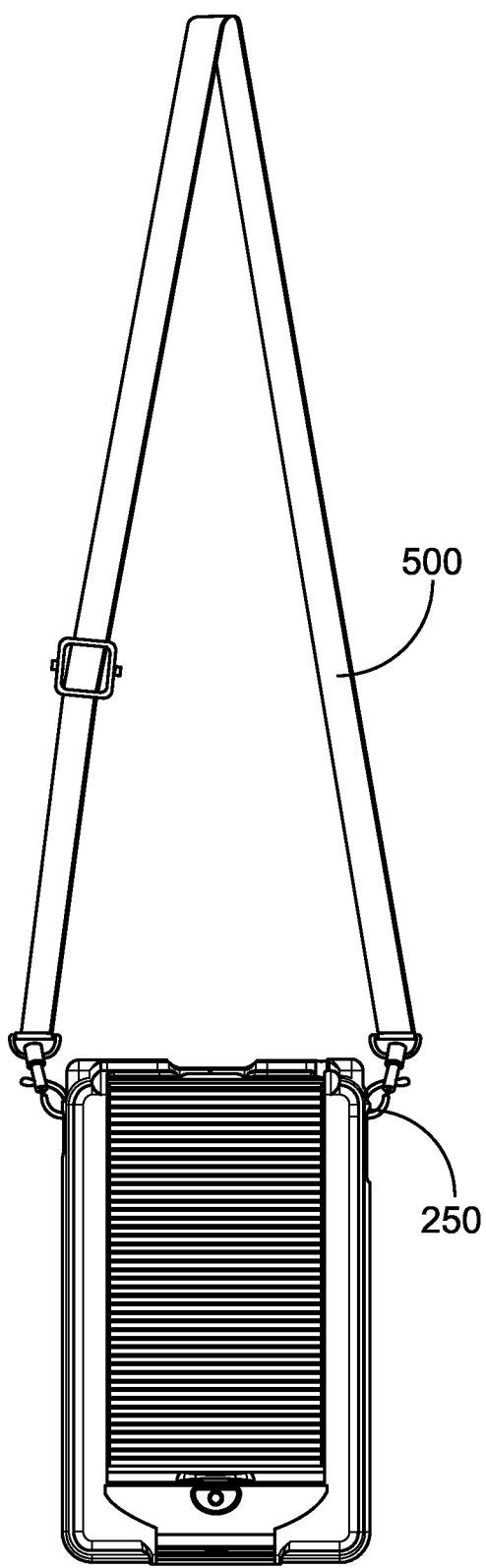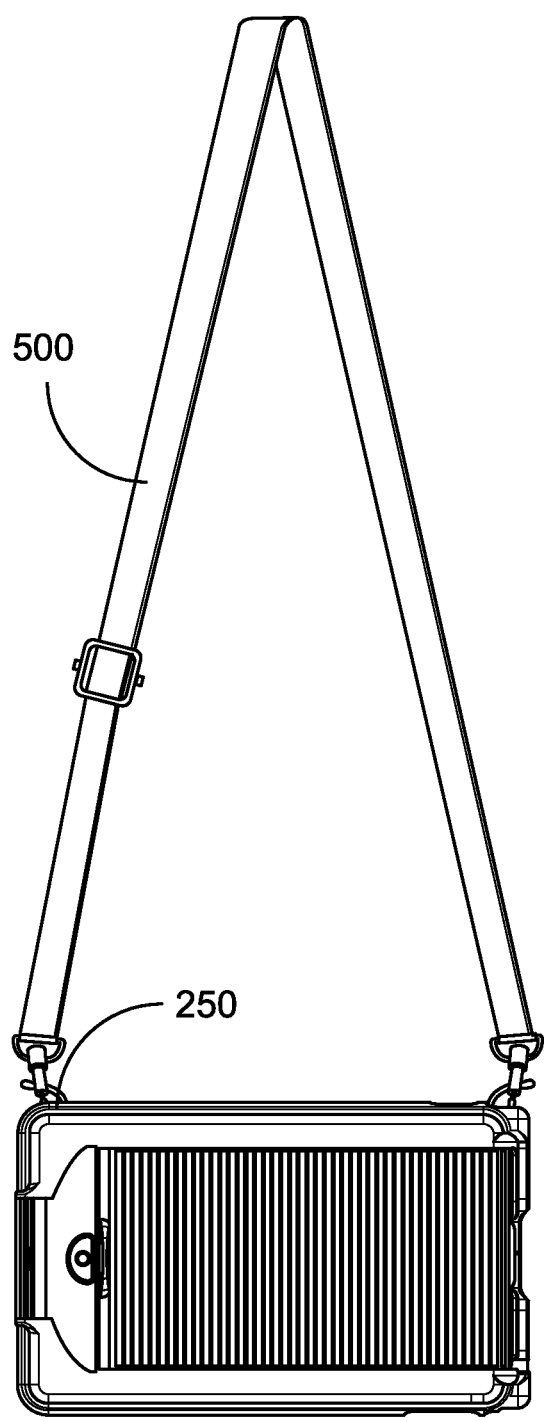
FIG.21  FIG.22

ROLL-BACK COVER FOR AN ELECTRONIC DEVICE

CROSS REFERENCE TO RELATED APPLICATIONS

The present application is based on U.S. provisional application No. 61/643,245 filed on May 5, 2012, the entire contents of which are incorporated by reference. Applicant claims the priority benefit of the 61/643,245 application.

BACKGROUND OF THE INVENTION

A protective roll-back cover for an electronic device is provided. The roll-back cover is suitable for use in association with an iPad®, Kindle®, Nook®, a cell phone, a reader, a tablet or other similar electronic devices. The device has a protective cover which rolls from a closed First Position A to an open Second Position B. In the closed First Position A, the screen of the electronic device is covered and protected. In the open Second Position B, the protective cover is rolled back into a storage area and a user may access the screen of the electronic device. The device further has a removable additional storage compartment(s), a rotatable stand, a sun screen and a movable storage area for storing a stylist.

The screen of an electronic device is generally the most vulnerable part of the device. During everyday life, numerous electronic devices are damaged or destroyed as a result of the screen of the electronic device being cracked, scratched or broken. Attempts have been made to provide protective coverings for electronic devices. For example, U.S. Pat. No. 8,051,980 to Tai discloses a protective sleeve for a portable electronic device which includes a sleeve frame, a cover, two connecting members, and a locking member. The sleeve frame includes four connecting sidewalls cooperatively defining a space for receiving the portable electronic device. The cover is covering the space of the sleeve frame. The connecting members are configured for pivotally/rotably attaching an end of the cover to the frame. The locking member is configured for latching and releasing, and thereby opening and closing the cover to the frame at another end of the cover. The protective sleeve for portable electronic device is convenient for use, and can fully protect the portable electronic device.

U.S. Pat. No. 7,555,325 to Goros discloses a protective sleeve for small portable electronic devices, in particular mobile or wireless telephones, is disclosed, comprising at least one strap-like elastic loop, which at least partly surrounds the external circumference of the device when applied to the device. According to the invention, only one loop is provided which is a highly elastic tubular ring, the material, diameter, height and wall thickness of which are arranged such that, when tightly applied to the device, the external circumferential cover of the device is covered and the end edges of the loop are drawn elastically inwards on both front faces of the device and lie thereon in the form of narrow strips, forming a frame.

U.S. Publication No.: 20030104850 to Lai discloses a PDA with a protective cover for its display panel. The technology of the invention relates mainly to a sliding protective cover for the body of a PDA (Personal Digital Assistant) with cellular phone functions. The protective cover may slide onto the display panel, providing protection for the display panel. In addition, on the protective cover there is a window opening, so that when the PDA is not in use, the display panel is covered with the protective cover. The display panel shows a small window, which is visible to a user, for displaying messages related to the cellular phone functions.

However, these protective devices for electronic devices fail to provide a light-weight protective covering with the features provided in the detailed description and in the accompanying drawings.

SUMMARY OF THE INVENTION

A protective roll-back cover for an electronic device is provided. The roll-back cover is suitable for use in association with an iPad®, Kindle®, Nook®, a cell phone, a reader, a tablet or other similar electronic devices. The device has a protective cover which rolls from a closed First Position A to an open Second Position B. In the closed First Position A, the screen of the electronic device is covered and protected. In the open Second Position B, the protective cover is rolled back into a storage area and a user may access the screen of the electronic device. The device further has a removable additional storage compartment(s), a rotatable stand, a sun screen and a movable storage area for storing a stylist.

An advantage of the present device is to provide a protective covering for an electronic device wherein a cover may roll from a protective First Position A to an operable Second Position B.

Yet another advantage of the present device is that the device may have a movable and bendable covering which stores a stylist of the device.

And an advantage of the present device is that the device may have a sound channel which deflects sound emitted from the back of an electronic device to the front of the electronic device.

Still another advantage of the present device is that the device has a rotatable stand which allows the device to stand upright in a portrait position or a landscape position.

And another advantage of the present device is that the device may have a securing mechanism for a strap.

An advantage of the present device is that the device may be secured on a stand having a strap portion.

Yet another advantage of the present device is that that device may have a hard cover which may have an exposed access port for headphones or earphones.

And an advantage of the present device is that the device may have additional storage compartments which may be removably secured to the back of the device.

Still advantage of the present device is that the device may store a cloth for cleaning the screen of the electronic device.

And an advantage of the device is that the device has strong exterior surfaces to protect the electronic device within the interior of the device.

An advantage of the device is that the device has a reinforced power port plug connector which protects the power plug of the device.

For a more complete understanding of the above listed features and advantages of the present roll-back cover for an electronic device, reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 12 illustrates an expanded view of the sun screen of the device.

FIG. 13 illustrates a perspective view of the device wherein the sun screen is in the operable portrait position on the protective covering for an electronic device.

FIG. 14 illustrates a perspective view of the device wherein the sun screen is in the operable landscape position on the protective covering for an electronic device.

FIG. 21 illustrates a carrying strap attached to the device in a portrait orientation.

FIG. 22 illustrates a carrying strap attached to the device in a landscape orientation.

DETAILED DESCRIPTION OF THE PREFERRED EMBODIMENTS

A protective roll-back cover for an electronic device is provided. The roll-back cover is suitable for use in association with an iPad®, Kindle®, Nook®, a cell phone, a reader, a tablet or other similar electronic devices. The device has a protective cover which rolls from a closed First Position A to an open Second Position B. In the closed First Position A, the screen of the electronic device is covered and protected. In the open Second Position B, the protective cover is rolled back into a storage area and a user may access the screen of the electronic device. The device further has a removable additional storage compartment(s), a rotatable stand, a sun screen and a movable storage area for storing a stylist.

Figure 1:
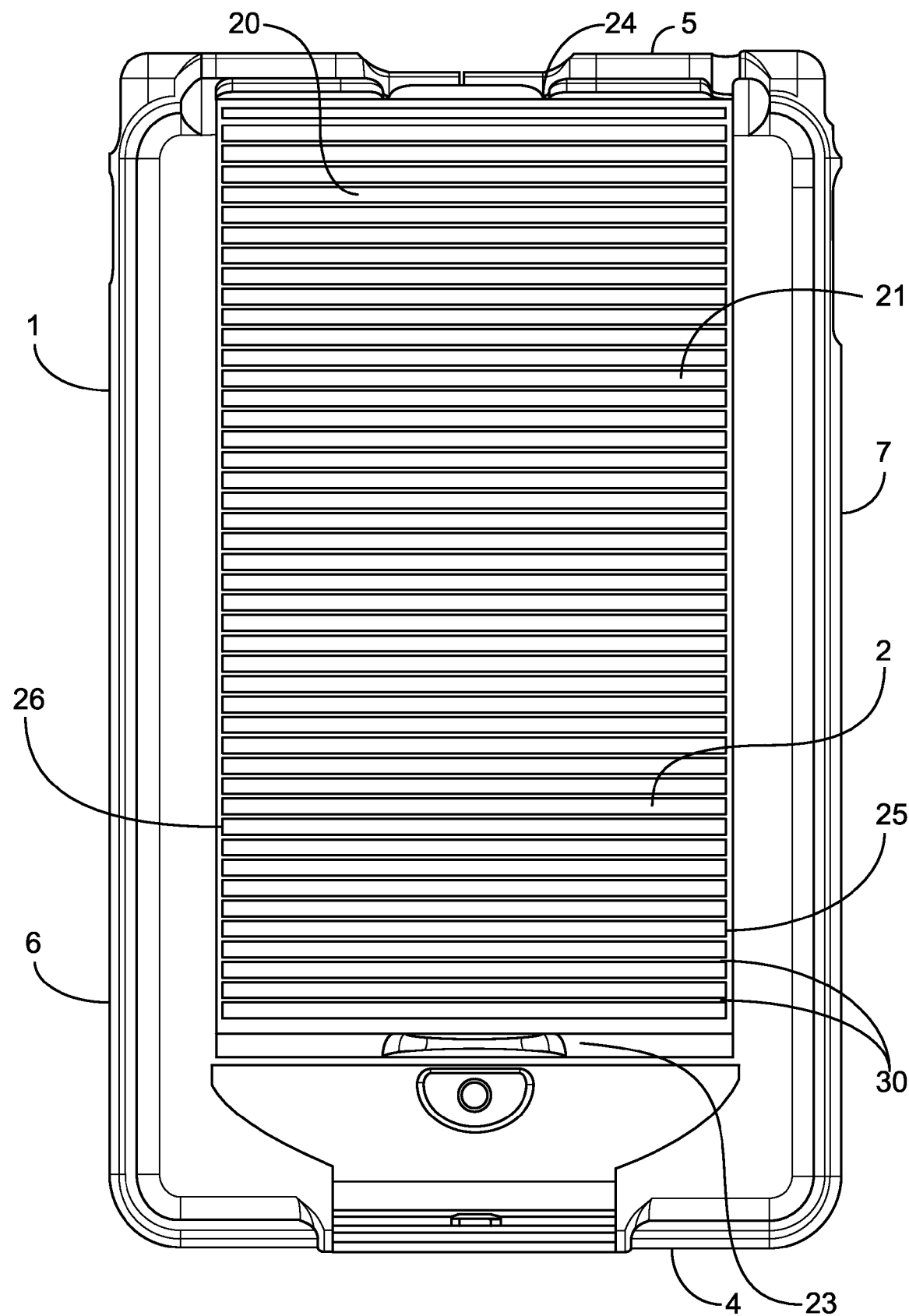
FIG. 1 illustrates a plan view of the top of the protective covering for an electronic device wherein the cover is in the closed First Position A.
Figures 17, 18, 19:
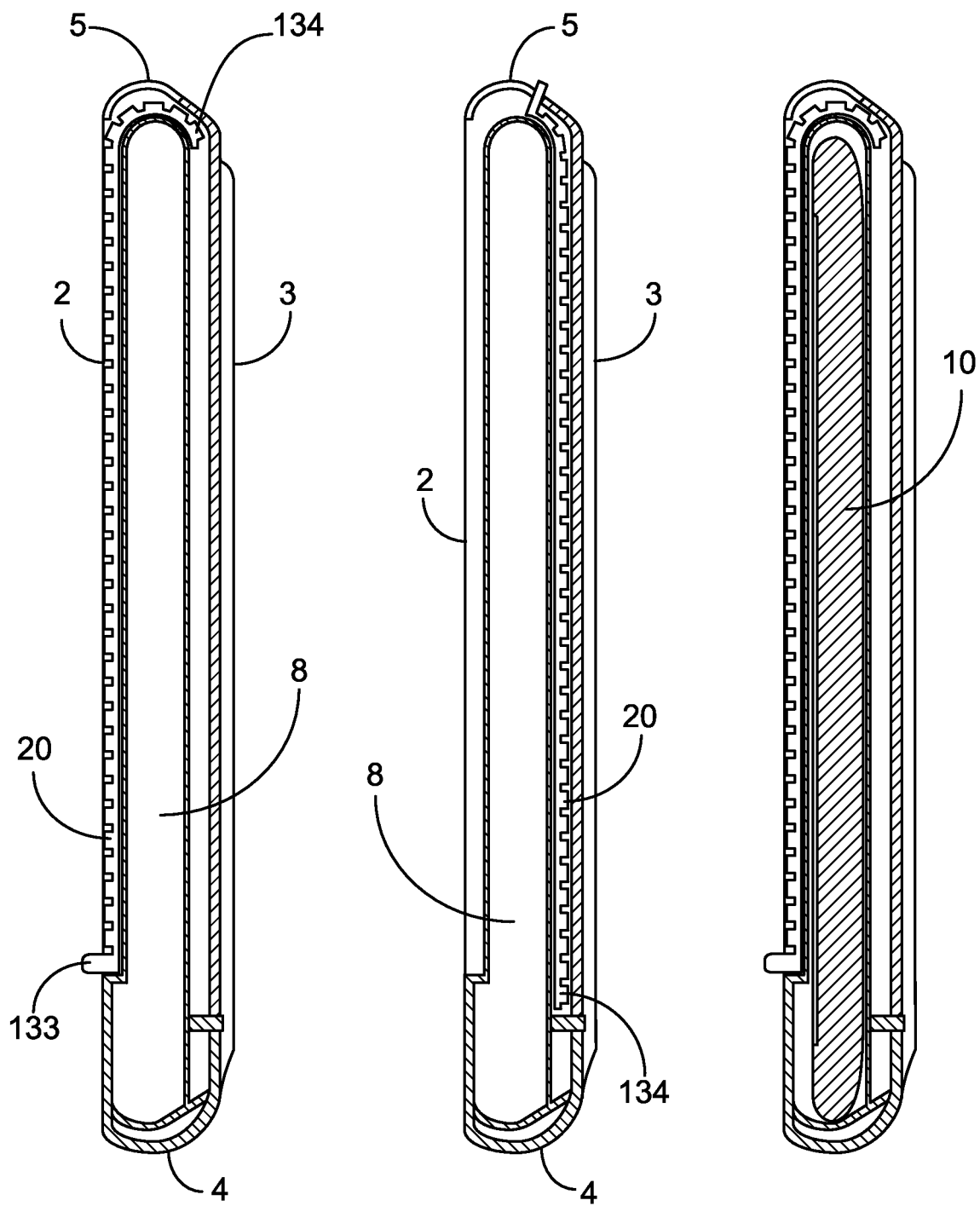
FIG. 17 illustrates a side cross-section view of the device wherein the interior is empty (lacking an electronic device) and the protective rolling cover 20 is in the closed First Position A.
FIG. 18 illustrates a side cross-section view of the device wherein the interior is empty and the protective rolling cover 20 is in the operable Second Position B.
FIG. 19 illustrates a side cross-section view of the device wherein the interior of the device has the electronic device inside.

Referring now to the drawings wherein like numbers refer to like parts, FIG. 1 illustrates the protective covering for an electronic device 1. The protective covering for an electronic device 1 may have a top 2, a bottom 3 (FIG. 3), a front 4, a back 5, a first side 6, a second side 7 and a generally hollow interior 8 (FIGS. 17-18). The interior 8 of the device 1 may allow a computer 10 (FIG. 19) having electrical circuitry to be inserted into the device 1. For example, the device 1 may accept an iPad®, Kindle®, Nook®, cell phone, reader, tablet or other similar electronic device. In an embodiment, the computer 10 and device 1 are formed as a single unit.

Figure 2:
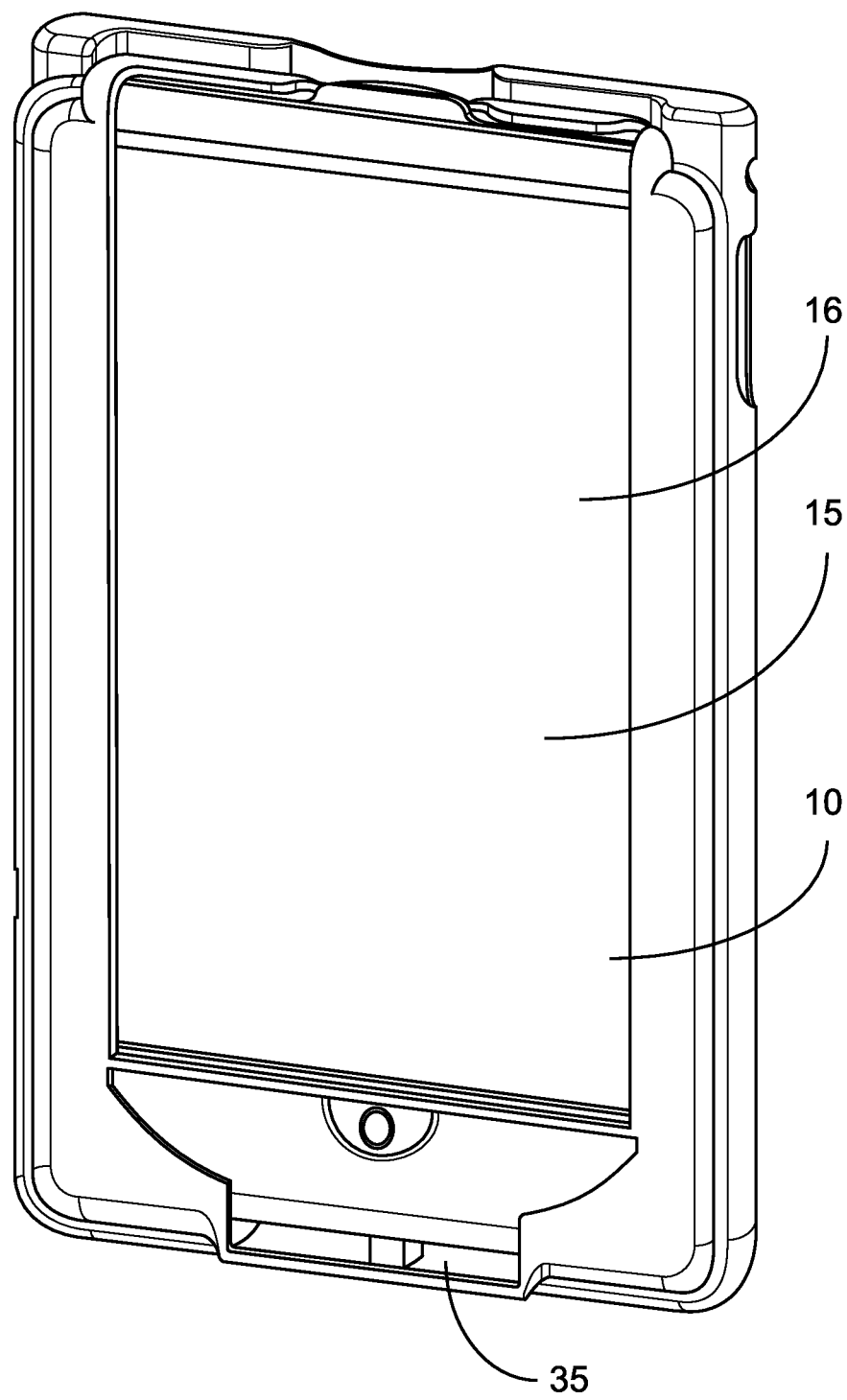
FIG. 2 illustrates a perspective view of the top of the protective covering for an electronic device wherein the cover is in the open Second Position B.

The computer 10 (FIG. 2) protected by the device 1 may have a top 15 having a generally large flat screen 16. In an embodiment, the large flat screen 16 is a touch screen. As a result of computer screens often becoming scratched, damaged or broken, the device 1 may have a protective rolling cover 20 (FIG. 1). The protective rolling cover 20 may move from a closed First Position A (FIG. 1) to an operable Second Position B (FIG. 2).

The protective rolling cover 20, and other elements of the device 1, may be made from, for example, a hard plastic, rubber or metal. The protective rolling cover 20 may have a top 21, a bottom (not shown), a front 23, a back 24, a first side 25 and a second side 26. The protective rolling cover 20 may have a plurality of crease 30 lines which run substantially parallel with respect to each other and substantially parallel with respect to the front 23 and back 24 of the device 1. The plurality of crease lines 30 may be located on the top 21 of the protective rolling cover 20 and may allow the protective rolling cover 20 to roll into the back 5 of device 1. When the protective rolling cover 20 is in the closed First Position A (FIG. 1) the screen 16 of the computer 10 is covered and the screen 16 and computer 10 are protected from damage. When the protective rolling cover 20 is in the operable Second Position B (FIG. 2) the screen 16 is accessible by the user and the computer 10 may be controlled by, for example, a touch command by the user or a stylus.

Referring now to FIG. 17-19, to move the protective rolling cover 20 off the screen 16, the user may manually slide the protective cover 20, with the aid of a tab 133 on the cover 20, toward the back 5 of the device 1. FIG. 17 illustrates the protective rolling cover 20 in the closed First Position A. As the user forces the tab 133 upward, a first end 134 (or back 24) of the protective rolling cover 20 begins to travel toward the front 4 of the device 1 along the bottom 3 of the device 1. When the protective rolling cover 20 is in the operable Second Position B, the protective rolling cover 20 remains largely flat (similar to when the protective rolling cover 20 is in the closed First Position A); however, in the operable Second Position B the protective rolling cover 20 is located on the bottom 3 of the device 1 instead of the top 2 of the device 1.

Figure 23:
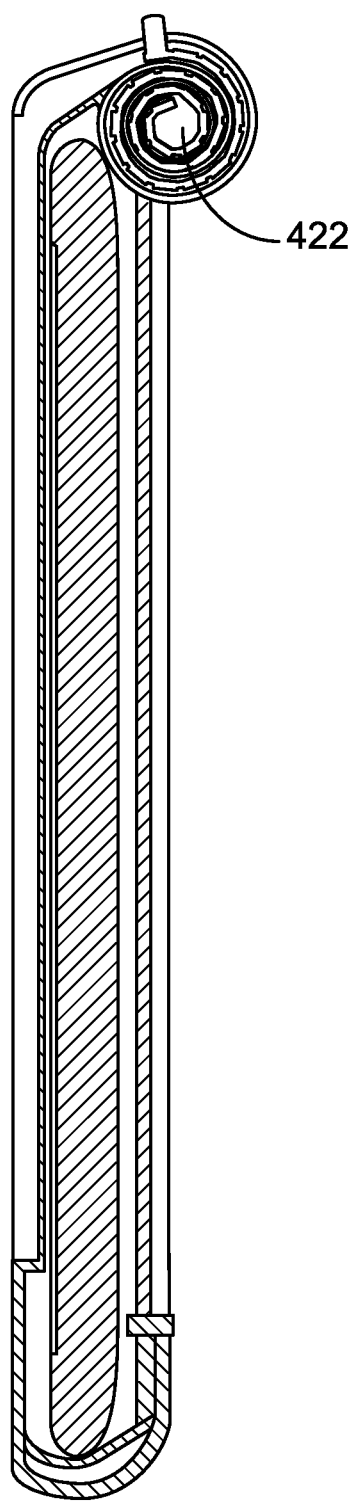
FIG. 23 illustrates an alternative embodiment wherein the protective rolling cover is stored in the operable Second Position B in a rolled up manner

In alternative embodiments, in the operable Second Position B, the protective rolling cover 20 may be stored within the interior 8 of the device 1 (between the bottom 3 of the device 1 and the computer 10). Further, in alternative embodiments, the protective rolling cover 20 may be stored outside the bottom 3 of the device 1 wherein the bottom 3 of the device 1 is located in between the computer 10 and the protective rolling cover 20. In yet another embodiment, the protective rolling cover 20 may be rolled and moved in a similar fashion to the sides 6, 7 of the device 1 (as opposed to rolling over the back 5). Finally, referring now to FIG. 23, in an embodiment, the protective rolling cover 20 may be store in a hollow interior compartment 422 in a rolled-up configuration.

Figure 3:
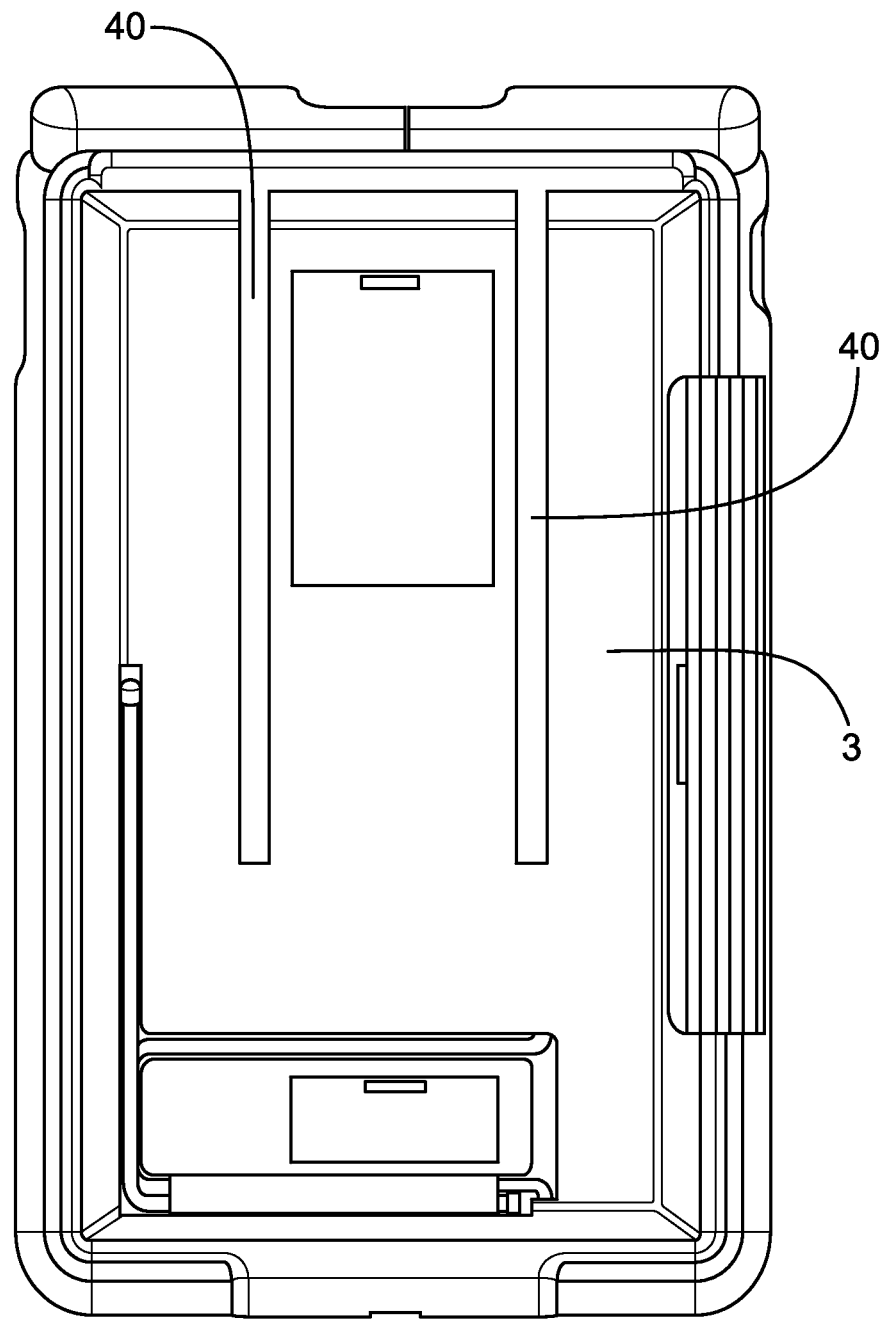
FIG. 3 illustrates a plan view of the bottom of the protective covering for an electronic device.
Figure 4:
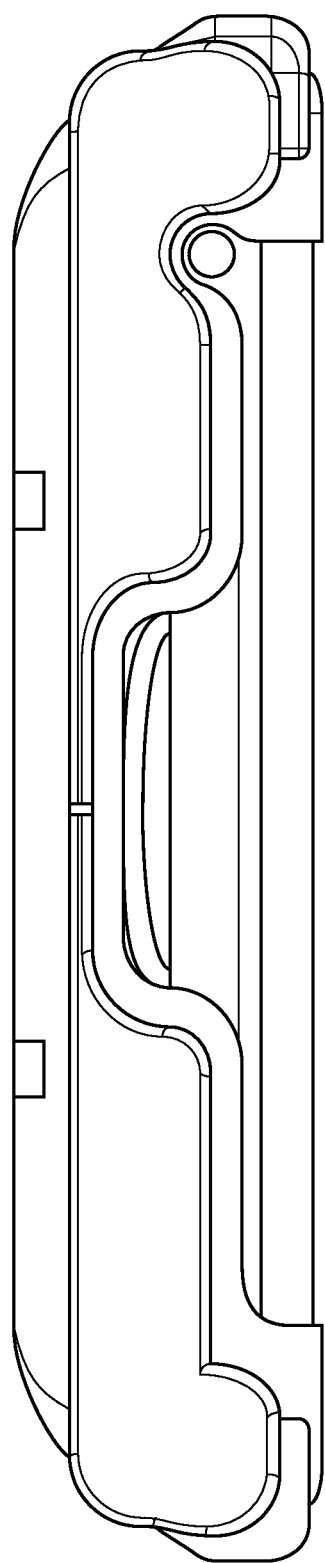
FIG. 4 illustrates a plan view of the side of the protective covering for an electronic device.
Figure 5:
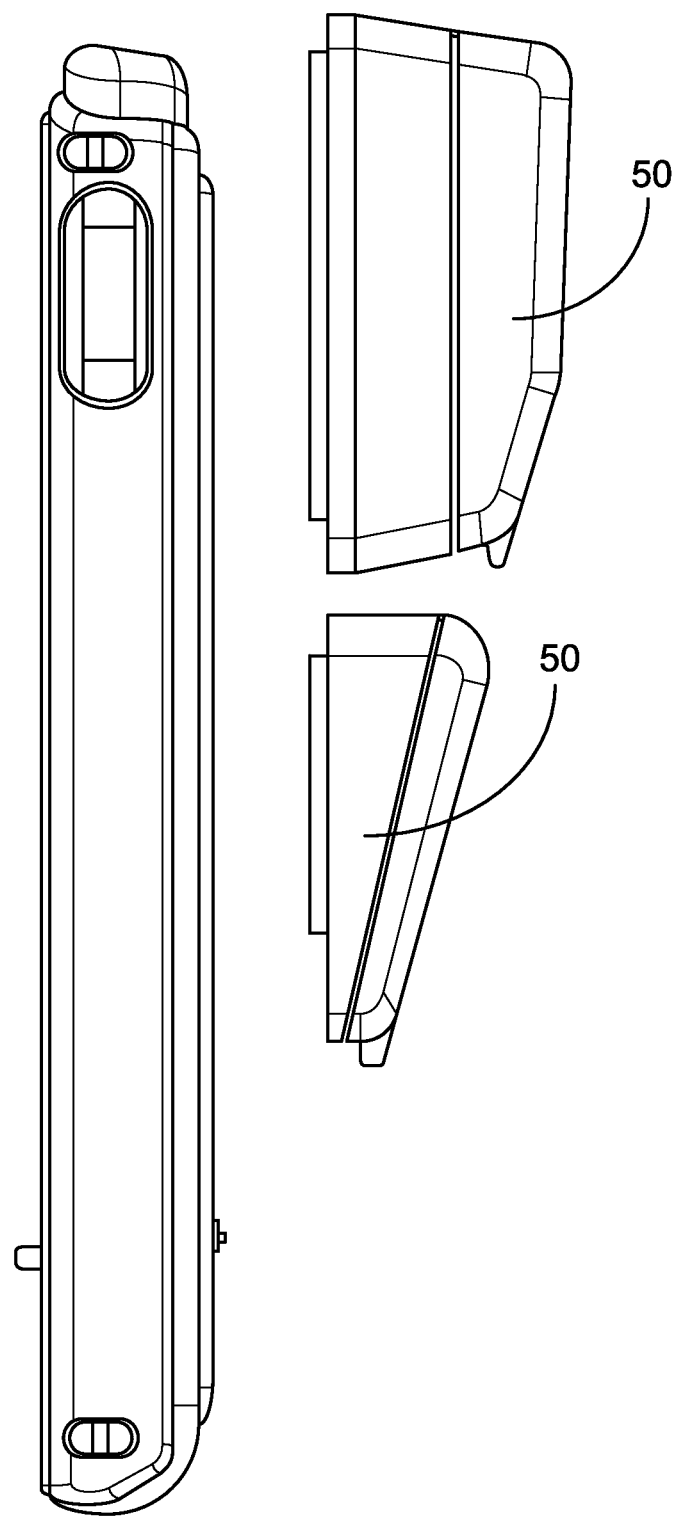
FIG. 5 illustrates a plan view of the side of the protective covering for an electronic device wherein additional storage compartments are in the process of being attached to the protective covering for an electronic device.

Referring now to FIG. 3, in an embodiment, located on bottom 3 of the device 1 may be at least two tracks 40. The tracks 40 may run substantially parallel with respect to each other and substantially parallel with respect to the first side 25 and second side 26 of the rolling cover 20. The tracks 40 may be, for example, elongated indentations wherein a removable additional storage compartment 50 (FIG. 5) may be inserted onto the bottom 3 of the device 1. In an embodiment, more than one removable additional storage compartments 50 may be used (as is illustrated in FIG. 5). The removable additional storage compartment(s) 50 may be a generally hollow compartment wherein a user may store additional items such as, for example, a power cord, additional batteries, memory disks, cleaning cloths, power adapters, money or any additional items of appropriate size. In an embodiment (FIGS. 6 and 7) the removable additional storage compartment(s) 50 may be sloped so as to allow the device 1 to rest and be used on an angle. In an embodiment, the angle of the slope of the removable storage compartments 50 is approximately twenty to fifty degrees with respect to the ground. When the removable storage compartment 50 is not secured to the device 1, the device 1 rests substantially parallel with respect to the ground. The device 1 may further have a compartment permanently attached (FIG. 3) which may store, for example, memory cards, earbuds or other similar items. In the embodiment with the permanent storage compartment, the permanent storage compartment may be located at the top 2 of the device 1. The removable storage compartment 50 may have a ridge which secures to a corresponding rail on the bottom 3 of the device 1.

Figure 10:
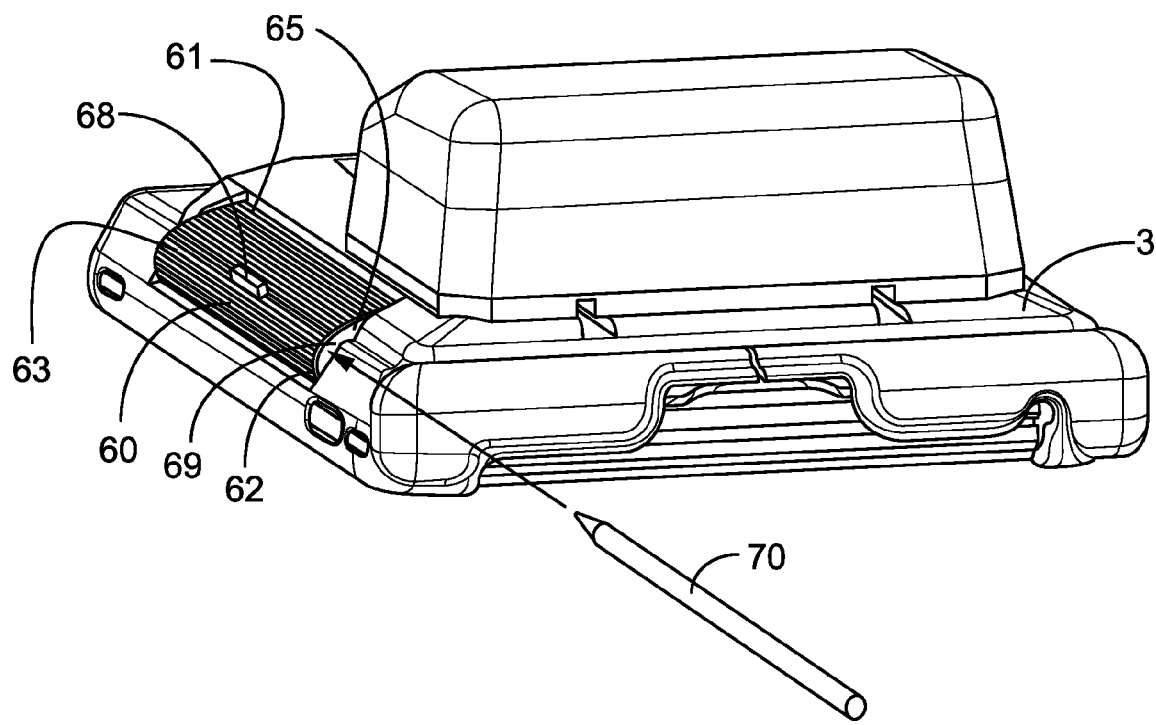
FIG. 10 illustrates a perspective view of the side of the device wherein the additional storage compartment is secured to the device and wherein the stylist holder is in the open position.
Figure 11:
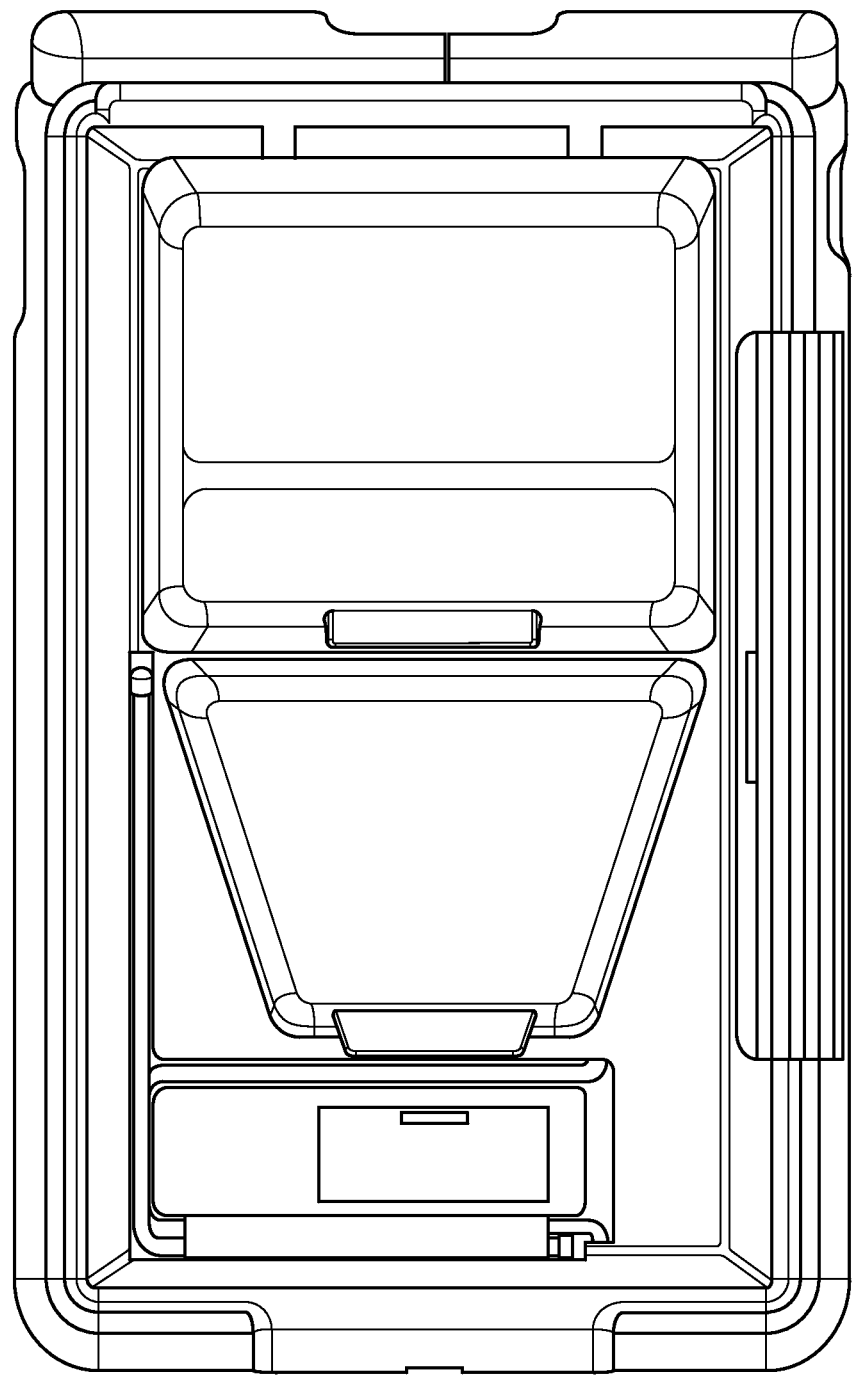
FIG. 11 illustrates a plan view of the bottom of the device.

In an embodiment, located at, for example, the junction of the bottom 3 and first side 6 of the device 1 may be a stylist holding device 60 (FIG. 10). It should be noted that the stylist holding device 60 may be located anywhere on the device 1. The stylist holding device 60 may have a first end 61, a second end 62 and a tab 68 wherein the tab 68 allows a finger to move the stylist holding device 60. Further, the stylist holding device 60 may be flexible. The first end 61 and the second end 62 of the stylist holding device 60 may be permanently secured to the device 1 wherein a main body 63 of the stylist holding device 60 is unsecured. In an embodiment, the first end 61 and the second end 62 of the stylist holding device 60 may not be visible to the user as a result of being located in an interior compartment.

A slot 65 may be present on the device 1 wherein the stylist holding device 60 covers the slot 65. A space 69 may be located between the main body 63 of the stylist holding device 60 and the slot 65. A user may pinch or otherwise pull on the main body 63 of the stylist holding device 60 (or move the tab 68) to slightly separate the stylist holding device 60 from the slot 65. In this pulled out position, the user my insert or remove a stylist 70. The first end 61 and the second end 62 of the stylist holding device 60 may be secured via an elastic or otherwise spring method such that when the user releases the main body 63 of the stylist holding device 60 the stylist holding device 60 snaps back and tightly secures the stylist 70 to the device 1.

Figure 7:
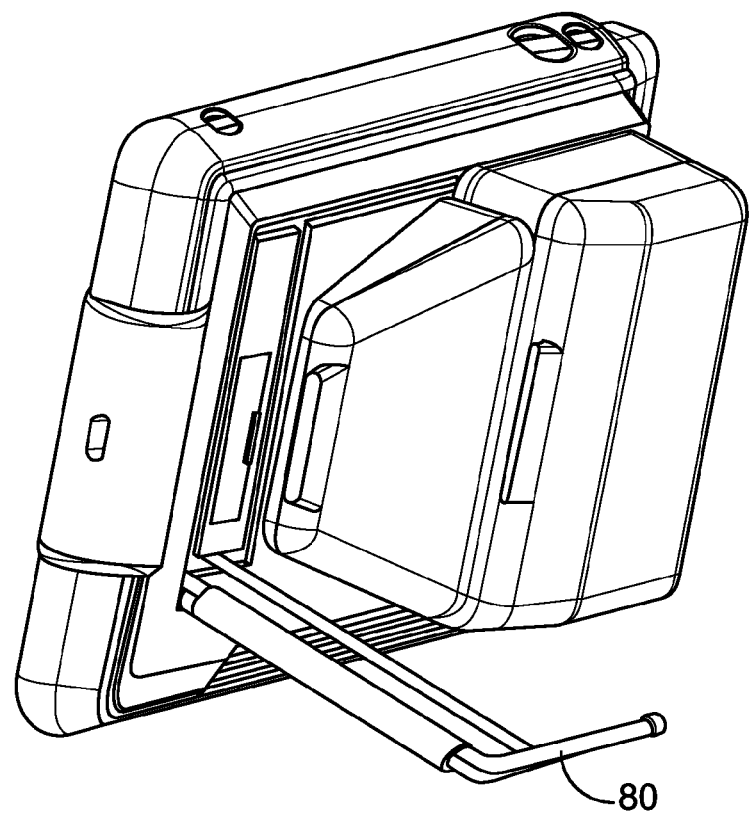
FIG. 7 illustrates a perspective view of the bottom of the device wherein a rotatable stand is used to keep the device upright in a landscape orientation.
Figure 8:
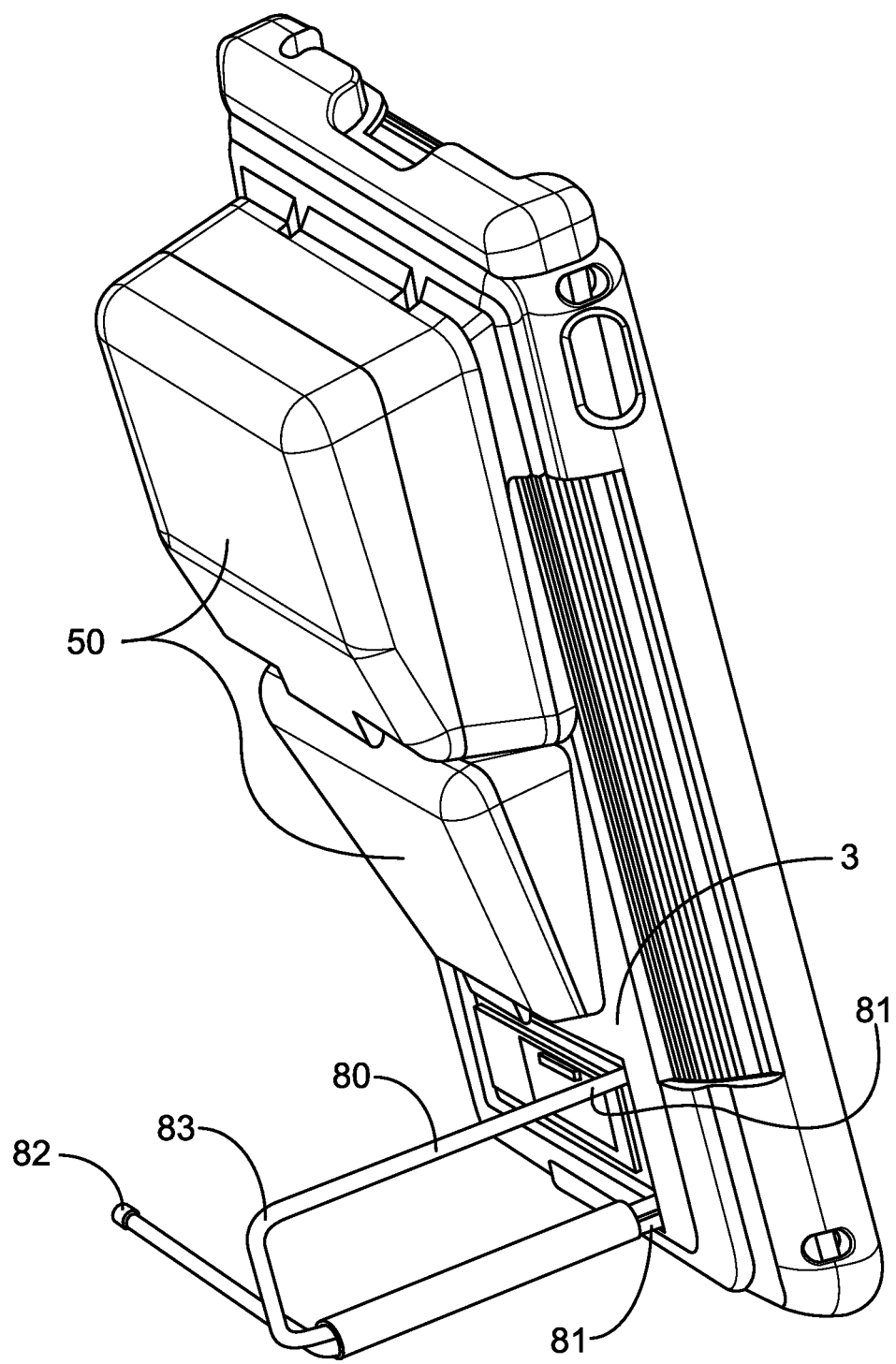
FIG. 8 illustrates a perspective view of the side of the device wherein a rotatable stand is used to keep the device upright in a portrait orientation.

Referring now to FIGS. 7 and 8, in an embodiment, the device 1 may have a rotatable stand portion 80. The rotatable stand portion 80 may have a first end 81, a second end 82 and a main body 83 wherein the first end 81 is permanently secured to the bottom 3 of the device 1. The second end 82 may be free moving. The second end 82 and main body 83 of the rotatable stand portion 80 may rotate away from the bottom 3 of the device 1. When the second end 82 and the main body 83 of the rotatable stand portion 80 are rotated away from the device 1 the rotatable stand portion 80 may be used to secure the device 1 in an upright landscape position (FIG. 7) or a portrait position (FIG. 8). When not in use, the rotatable stand portion 80 may rest substantially flat with respect to the bottom 3 of the device 1 in a groove of the device 1.

Figure 9:
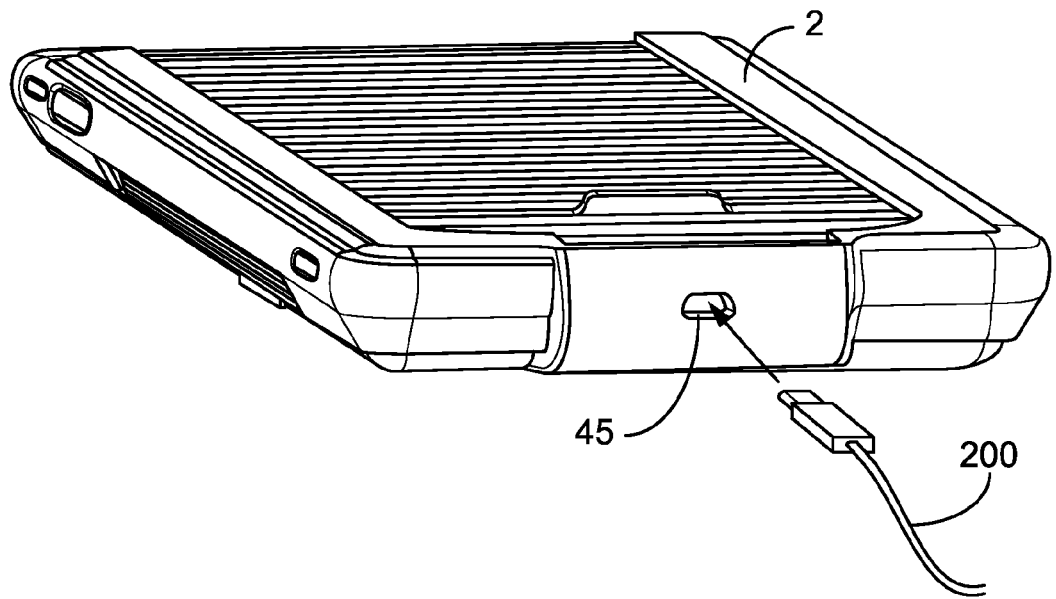
FIG. 9 illustrates a perspective view of the side of the device wherein the cover is in the closed First Position A.

In an embodiment, the device 1 may have a reinforced power plug port 45 (FIG. 9). The reinforced power plug port 45 may prevent the power plug of the device 1 from bending and becoming damaged as a result of the metal in the wiring bending or kinking The reinforced power plug port 45 may work by providing a reinforced extended channel through which the power cord 200 is plugged into the device 1. More specifically, the channel provides extra protection to the metal contact of the device 1 by not allowing the outer portion of the plug from moving up or down or side to side while the power cord 200 is connected to the plug of the device 1.

In an embodiment, the device 1 may have a sun screen 100 (FIGS. 12-14). The sun screen 100 may have a first side 110, a second side 111 and a center portion 112. The first side 110 and the second side 112 may be tapered so that the farther away from the center portion 112 the first side 110 and second side 111 get, the shorter the height 113 the first side 110 and the shorter the height of the second side 112 become. In an embodiment, a first hinge portion 115a may be located between the first side 110 and the center portion 112 and second hinge portion 115b may be located between the second side 111 and the center portion 112. The hinge portions 115a, 115b may allow the first side 110 and second side 111 to rotate around the center portion 112 approximately ninety degrees from a substantially flat orientation into a substantially perpendicular orientation with respect to the center portion 112.

Figure 20:
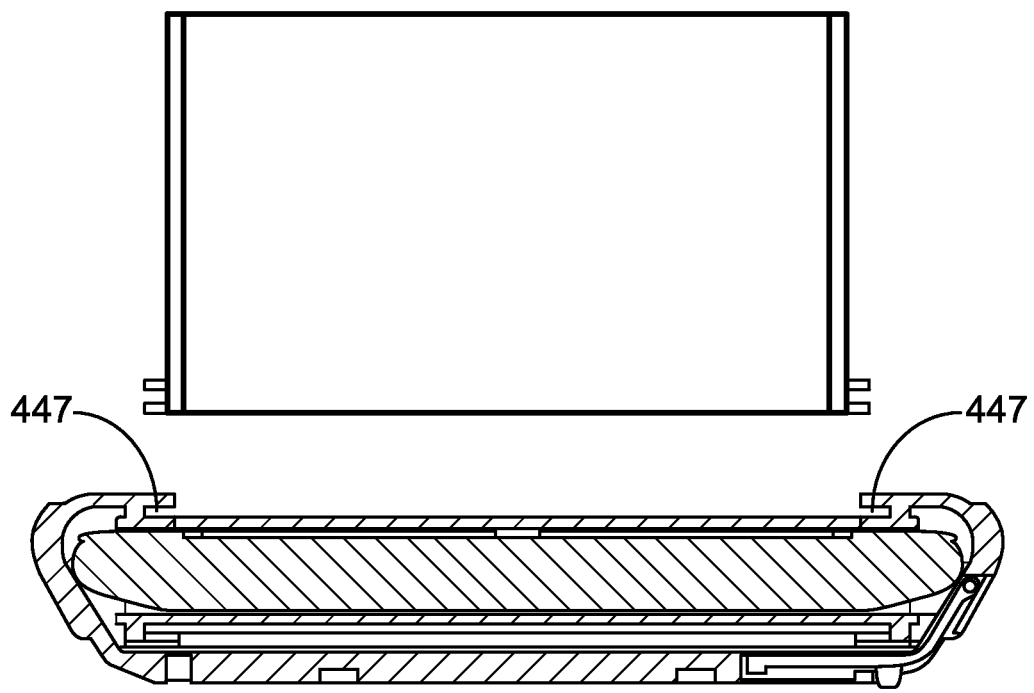
FIG. 20 illustrates a cut away view of the bottom of the device wherein the sun screen is being attached to the device.

The sun screen 100 may have a plurality of tabs 120. The tabs 120 may be located on a bottom end 210 of the sun screen 100. The tabs 120 may allow the sun screen 100 to be secured around, for example, three of the four edges of the generally large flat screen 16 of the computer 10. As a result, the generally large flat screen 16 may remain in shadow during use therein allowing the user to more easily view the information electronically displayed on the generally large flat screen 16. In an embodiment, the sun screen 100 may be secured to the device 1 in a landscape orientation (FIG. 14) or a portrait orientation (FIG. 13). The tabs 120 may fit into openings 447 (FIG. 20) of the device 1. In an embodiment, the sun screen 100 may be removed when not in use and secured to the bottom 3 of the device 1 in a storage compartment.

To secure the tabs 120 to the device 1, the user slides the generally square shaped tabs 120 into correspondingly shaped openings 447 on the device 1. The tabs 120 may be secured within the openings 447 by means of, for example, friction. More specifically, the user may slightly bend the sun screen 100 so that the tabs 120 of the sun screen 100 move inward just enough to be slid into the openings 447. To remove the sunscreen 100, the reverse process is implemented.

The hinge portions 115a, 115b may have a width 116. The width 116 of the hinge portions 115a 115b may allow the sun screen 110 to be used in the landscape orientation or the portrait orientation. More specifically, if the sun screen 100 is used in the portrait orientation the hinge portions 115a, 115b are located at a ninety degree angle with respect to the center portion 112. If the sun screen 100 is used in the landscape orientation, the hinge portions 115a, 115b may be located at approximately one hundred and eighty degrees with respect to the center portion 112.

In an embodiment, the device 1 may have a sound channel deflector 35 (FIG. 2). The sound channel deflector 35 may allow sound waves emitted from the back of the computer 10 to bounce off an interior surface of the bottom 3 of the device 1 and be reflected into the forward position (toward the top 2 of the device 1), toward the user. As a result, the user may more easily hear the sound emitted from the back of the computer 10 and the device 1 will not hinder sound which may be emitted from speakers located on the back of the electronic device 10.

Figure 6:
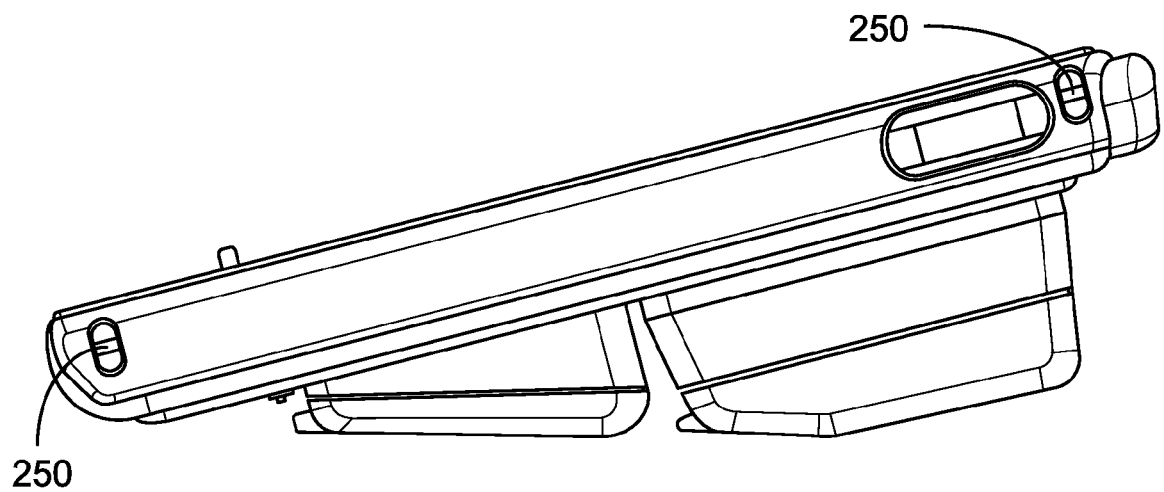
FIG. 6 illustrates a side view of the protective covering for an electronic device wherein the additional storage compartments are secured to the device.
Figure 15:
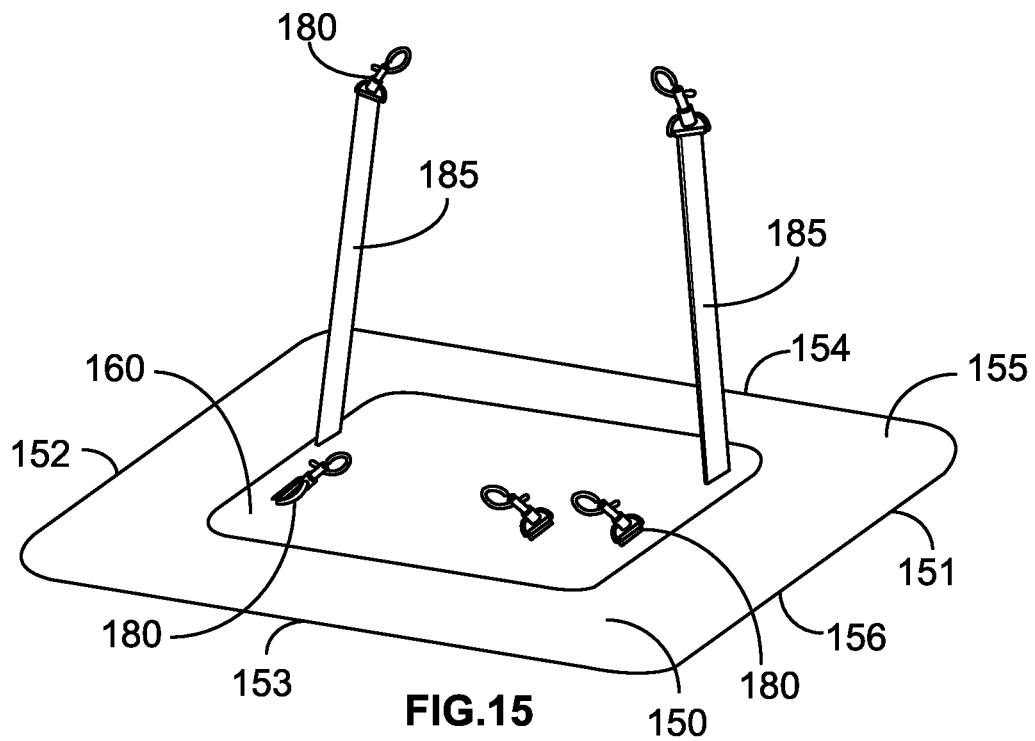
FIG. 15 illustrates a perspective view of the slip resistant fabric pad and strap attachment for securing the device.
Figure 16:
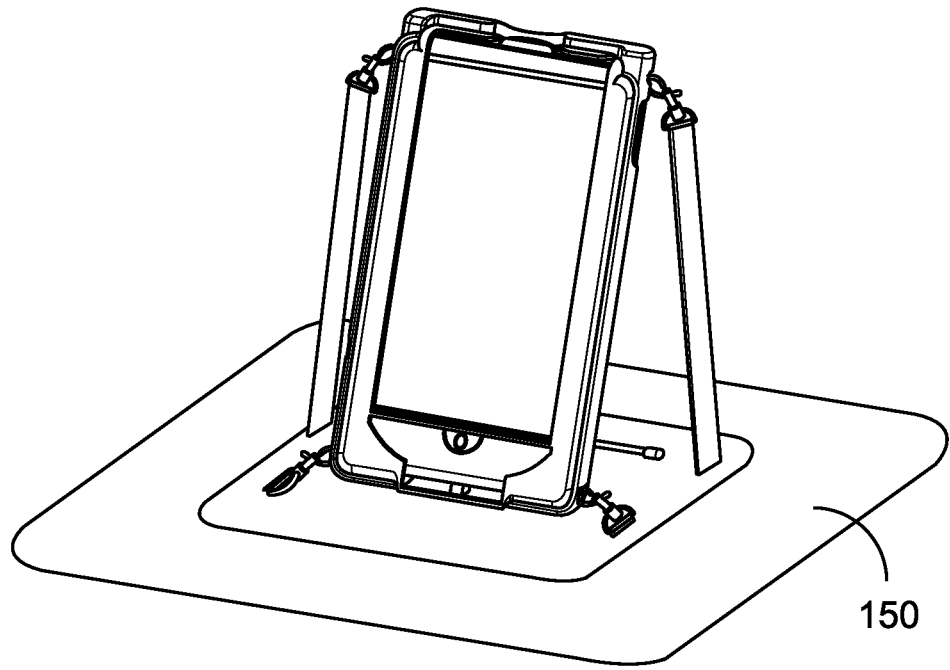
FIG. 16 illustrates a perspective view of the slip resistant fabric pad and strap attachment for securing the device wherein the device is secured to the strap attachment.

Referring now to FIGS. 15 and 16, in an embodiment, the device 1 may be secured to a slip resistant fabric pad 150. The slip resistant fabric pad 150 may have a first end 151, a second end 152, a front 153, a back 154, a top 155 and a bottom 156. FIGS. 15 and 16 illustrate the slip resistant fabric pad 150 as generally square in shape; however any suitable shape may be used. Located within the interior portion of the slip resistant fabric pad 150 may be a rigid center platform 160. A plurality of clips 180 may be located at a front of the ridged center platform 160. Additional clips 180 may be located on top of a plurality of strap attachments 185 located at the back of the ridged center platform 160. The clips 180 may be secured to carrying strap attachments 250 located directly on the device 1 (FIG. 6).

The carrying strap attachments 250 may further be used to secure a carrying strap 500 in which the user may carry around the device 1. The carrying strap attachments 250 and the carrying straps 500 may allow a user to electively carry the device 1 in a portrait orientation (FIG. 21) or a landscape orientation (FIG. 22).

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A cover for an electronic device comprising:
a housing have a first end, a second end, a front, a back, a top, a bottom and a generally hollow interior;
a rolling cover secured to the housing wherein the rolling cover is located on the top of the housing wherein the rolling cover moves from a first position to a second position and wherein the interior of the housing may be accessed through an opening at the top of the housing when the rolling cover is in the second position and wherein the interior of the housings is substantially inaccessible through the opening at the top of the housing when the rolling cover is in the first position;
a tab for grasping or pushing located on a top of the rolling cover wherein the tab allows a user to move the rolling cover from the first position to the second position;
a storage compartment removably secured to the bottom of the housing wherein the storage compartment stores personal items;
wherein the rolling cover moves from the top of the housing to the bottom of the housing; and
wherein an electronic device is placed within the interior of the housing and wherein a screen of the electronic device is accessible when the rolling cover is in the second position.

2. The cover for an electronic device of claim 1 further comprising:

a plurality of parallel crease lines on a top of the rolling cover which allows the rolling cover to move from the first position to the second position by bending at the crease lines.

3. The cover for an electronic device of claim 1 further comprising:
an opening at the front of the housing wherein the opening at the front of the housing allows a sound wave deflected from a speaker on the back of the electronic device to reach the front of the housing and extend away from the housing in the direction of a user of the electronic device.

4. The cover for an electronic device of claim 1 further comprising:
a rail located on the back of the housing wherein the rail accepts a corresponding ridge located on the removable storage compartment and wherein the removable storage compartment has a hollow interior for storing personal items and wherein the rail allows the removable storage compartment to be removably secured to the back of the housing.

5. The cover for an electronic device of claim 4 wherein the removable storage compartment has an sloped bottom side which allows the housing to rest on a slope with respect to the ground when the removable storage compartment is secured to the bottom of the housing and wherein the housing rests parallel with the ground when the removable storage compartment is not secured to the housing and wherein the removable storage compartment has a hollow interior for storing personal items.

6. The cover for an electronic device of claim 1 further comprising:
a stabilizing bar secured to the bottom of the housing wherein the stabilizing bar has a first end and a second end wherein the first end is secured to the housing and wherein the second end is not secured to the housing and wherein the stabilizing bar moves from a first position to a second position or a third position wherein the stabilizing bar is substantially flush with respect to the bottom of the housing when in the first position and wherein the stabilizing bar allows the housing to rest in a portrait orientation in the second position and allows the housing to rest in a landscape orientation when the stabilizing bar is in the third position and wherein the stabilizing bar may pivot at the first end and may rotate between the three positions.

7. The cover for an electronic device of claim 1 further comprising:
an opening on the first side, the second side, the front or the back of the housing wherein the opening has an extended reinforced channel which receives an electric cord and wherein the extended reinforced channel prevents the bending of the electrical cord.

8. The cover for an electronic device of claim 1 further comprising:
a sunscreen having a first side, a second side, a middle section, a first hinge portion having a width and a second hinge portion having a width wherein the first hinge portion is located between the first side and the middle section and wherein the second hinge portion is located between the second side and the middle section wherein the first side, the second side and the middle section are secured to the housing and wherein the sunscreen creates shade over the electronic device.

9. The cover for an electronic device of claim 8 wherein the width of the first hinge portion and the width of the second hinge portion are identical and wherein the sunscreen may be folded in a first position wherein in the first position the first side and first hinge portion and are located along the same plane and wherein the second hinge portion and second side are located along the same plane and wherein the middle section is located at a ninety degree angle with respect to the first hinge portion, the second hinge portion, first side and the second side.

10. The cover for an electronic device of claim 9 wherein the width of the first hinge portion and the width of the second hinge portion are identical and wherein the sunscreen may be folded in a second position wherein in the second position the first side and first hinge portion and are located at approximately ninety degrees with respect to each other and wherein the second hinge portion and second side are located approximately ninety degrees with respect to each other and wherein the first hinge portion and the second hinge portion and the middle section are all parallel and all located along the same plane.

11. The cover for an electronic device of claim 1 further comprising:
   a platform having a top, a bottom, a front, a back, a first side and a second side;
   a securing strap ring located on the top of the platform; and
   a securing strap having a first end and a second end wherein the first end of the securing strap is secured to the securing strap ring and wherein the second end of the securing strap is temporarily secured to the housing and wherein the securing strap secures the housing to the platform.

12. The cover for an electronic device of claim 11 wherein the housing is secured in a portrait orientation on the top of the platform.

13. The cover for an electronic device of claim 11 wherein the housing is secured in a landscape orientation on the top of the platform.

14. A cover for an electronic device comprising:
   a housing have a first end, a second end, a front, a back, a top, a bottom and a generally hollow interior;
   a rolling cover secured to the housing wherein the rolling cover is located on the top of the housing wherein the rolling cover moves from a first position to a second position and wherein the interior of the housing may be accessed through the top of the housing when the rolling cover is in the second position and wherein the interior of the housings is substantially inaccessible through the top of the housing when the rolling cover is in the first position;
   a tab for grasping or pushing located on a top of the rolling cover wherein the tab allows a user to move the rolling cover from the first position to the second position;
   a stylus holding device secured to the housing wherein the stylus holding device has a first end located within the interior of the housing, a second end located within the interior of the housing and a middle section and wherein the first and the second end are permanently secured to the housing and wherein the middle section is not secured to the housing;
   wherein the stylus holding device is elastic or secured to an elastic element and wherein the stylus holding device remains largely flush with the housing when resting in a first position and wherein a user may apply pressure to pull the middle section of the stylus holding device partially away from the housing therein creating a space and wherein a removable stylus may be stored and removed from space between the middle section of the stylus holding device and the housing; and
   wherein an electronic device is placed within the interior of the housing and wherein a screen of the electronic device is accessible when the rolling cover is in the second position.

* * * * *